(12) United States Patent
Ichikawa et al.

(10) Patent No.: US 9,073,441 B2
(45) Date of Patent: Jul. 7, 2015

(54) WIRE HOUSING DEVICE, VEHICLE EQUIPPED WITH THE SAME, AND POWER FEEDING DEVICE

(75) Inventors: Shinji Ichikawa, Toyota (JP); Daisuke Ishii, Toyota (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 337 days.

(21) Appl. No.: 13/497,423

(22) PCT Filed: Dec. 28, 2009

(86) PCT No.: PCT/JP2009/071738
§ 371 (c)(1), (2), (4) Date: Mar. 21, 2012

(87) PCT Pub. No.: WO2011/080811
PCT Pub. Date: Jul. 7, 2011

(65) Prior Publication Data
US 2012/0262115 A1 Oct. 18, 2012

(51) Int. Cl.
*H02J 7/00* (2006.01)
*B60L 11/18* (2006.01)
(Continued)

(52) U.S. Cl.
CPC .......... *B60L 11/1816* (2013.01); *B60L 11/005* (2013.01); *B60L 11/14* (2013.01); *B60L 11/1825* (2013.01); *B60L 11/1887* (2013.01); *B60L 2210/14* (2013.01); *B60L 2210/40* (2013.01); *B60L 2220/14* (2013.01); *B60L 2230/12* (2013.01); *B60L 2240/36* (2013.01); *H01R 13/72* (2013.01); *H01R 2201/26* (2013.01); *Y02T 10/7088* (2013.01); *Y02T 90/121* (2013.01); *Y02T 90/127* (2013.01); *Y02T 90/128* (2013.01); *Y02T 90/14* (2013.01); *Y02T 10/7077* (2013.01); *Y02T 10/7241* (2013.01); *Y02T 10/7022* (2013.01); *Y02T 10/7225* (2013.01); *Y02T 90/34* (2013.01); *Y02T 10/70* (2013.01)

(58) Field of Classification Search
CPC ... Y02T 90/14; Y02T 10/7005; Y02T 90/128; Y02T 10/7088; Y02T 90/163
USPC ......................................................... 320/109
See application file for complete search history.

(56) References Cited

U.S. PATENT DOCUMENTS 3,831,551 A * 8/1974 Kime ............................ 118/694
3,968,954 A * 7/1976 Casco et al. .................. 254/332
(Continued)

FOREIGN PATENT DOCUMENTS

JP U-1-96478 6/1989
JP A-8-24184 1/1996
(Continued)

OTHER PUBLICATIONS

International Search Report issued in International Patent Application No. PCT/JP2009/071738 dated Mar. 9, 2010.

*Primary Examiner* — Arun Williams
(74) *Attorney, Agent, or Firm* — Oliff PLC

(57) ABSTRACT

In a cord reel capable of housing a power cord for transmitting electric power from an external power source to a vehicle that can be externally charged, pulling-out of the power cord wound around the cord reel from the cord reel is suppressed based on a temperature of the power cord. This can prevent a hot charging cord from exerting influence on the surroundings, such as breakage of equipment or the like which touches the hot charging cord.

13 Claims, 5 Drawing Sheets

(51) Int. Cl.
    *B60L 11/00*    (2006.01)
    *B60L 11/14*    (2006.01)
    *H01R 13/72*    (2006.01)

(56) References Cited

U.S. PATENT DOCUMENTS

| | | | | |
|---|---|---|---|---|
| 4,135,402 | A | * | 1/1979 | Wakamatsu et al. .......... 307/117 |
| 4,212,606 | A | * | 7/1980 | Sachleben, Sr. ............. 425/72.2 |
| 4,656,320 | A | * | 4/1987 | Maddock ..................... 191/12.4 |
| 5,154,022 | A | * | 10/1992 | Chalco et al. .................. 451/36 |
| 5,804,092 | A | * | 9/1998 | Axelson et al. ............... 219/270 |
| 2007/0096538 | A1 | * | 5/2007 | Niemi et al. ................. 299/1.05 |
| 2007/0240779 | A1 | * | 10/2007 | Kamiyama et al. ............. 138/98 |
| 2009/0316321 | A1 | * | 12/2009 | Ouwerkerk ................... 361/106 |

FOREIGN PATENT DOCUMENTS

| | | |
|---|---|---|
| JP | A-8-83640 | 3/1996 |
| JP | A-2003-219511 | 7/2003 |
| JP | A-2003-244832 | 8/2003 |
| JP | A-2009-179472 | 8/2009 |

* cited by examiner

WIRE HOUSING DEVICE, VEHICLE EQUIPPED WITH THE SAME, AND POWER FEEDING DEVICE

TECHNICAL FIELD

The present invention relates to a wire housing device, a vehicle equipped with the same, and a power feeding device. More specifically, the present invention relates to control of suppressing pulling-out of a cable housed on a cord reel in accordance with the a temperature of the cable.

BACKGROUND ART

Recently, vehicles which are equipped with a power storage device (for example, such as a secondary battery or a capacitor) and run using driving power generated from electric power stored in the power storage device have been attracting attention as environmentally friendly vehicles. Such vehicles include, for example, electric cars, hybrid cars, fuel cell cars, and the like. Moreover, techniques of charging a power storage device mounted in these vehicles using a commercial power source having high power generation efficiency have been proposed.

In hybrid cars, vehicles in which charging of a vehicle-mounted power storage device from a power source external to the vehicle (hereinafter also simply referred to as an "external power source") can be performed (hereinafter also referred to as "external charging") as in electric cars have been known. For example, a so-called "plug-in hybrid car" is known, in which a power storage device can be charged from a general household power source by connecting a power outlet provided in a house and a charging inlet provided in a vehicle using a charging cable. Thereby, an increase in fuel consumption efficiency of hybrid cars can be expected.

For a charging cable used for external charging using such a charging cable, a cord reel may be used for taking up and housing the charging cable when external charging is not performed.

Japanese Patent Laying-Open No. 2003-244832 (PTL 1) discloses a technique of limiting a charging current or inhibiting charging in an electric car that performs charging using a cord provided in a car body, in accordance with a taken-up state of the take-up cord for charging a battery.

CITATION LIST

Patent Literature

PTL 1: Japanese Patent Laying-Open No. 2003-244832
PTL 2: Japanese Patent Laying-Open No. 2009-179472
PTL 3: Japanese Patent Laying-Open No. 8-024184

SUMMARY OF INVENTION

Technical Problem

When a charging cord is provided in a car body of a vehicle that can be externally charged, the charging cord has to be housed within a limited space in the car body. Therefore, it is conceived to employ a cord reel for taking up the charging cord to ensure a space for housing the charging cord.

When a current flows through the charging cord, the charging cord may generate heat due to internal resistance of the charging cord. In particular, it takes a relatively long time to charge the vehicle by external charging, and if external charging is performed with the charging cord being taken up on the cord reel, heat is likely to stay at a portion where the cord is wound in an overlapped state, and the charging cord can become hot.

If the charging cord is pulled out from the cord reel by a charging operator or the like in such a case, the hot charging cord can exert influence on the surroundings, such as breakage of equipment or the like which touches the hot charging cord.

The present invention has been made to solve the aforementioned problem, and one object of the present invention is to suppress, in a cord reel capable of housing a power cord for transmitting electric power from an external power source to a vehicle that can be externally charged, pulling-out of the cord from the cord reel based on a temperature of the cord wound around the cord reel, and thereby prevent influence on the surroundings exerted by the hot charging cord.

Solution to Problem

A wire housing device according to the present invention is a wire housing device configured to be capable of housing a wire for transmitting electric power from a power source, including an inhibition unit configured to suppress pulling-out of the wire from the wire housing device in accordance with a temperature of the wire.

Preferably, the wire housing device further includes a temperature detection unit for detecting the temperature of the wire, and a control unit for controlling the inhibition unit to suppress pulling-out of the wire from the wire housing device based on the temperature.

Preferably, the control unit controls the inhibition unit to suppress pulling-out of the wire if the temperature of the wire is higher than a first threshold value.

Preferably, the control unit releases suppression of pulling-out of the wire if the temperature of the wire becomes higher than the first threshold value and thereafter becomes lower than a second threshold value which is lower than the first threshold value.

Preferably, the wire housing device further includes a drum configured to be capable of winding and housing a cord, and a ratchet mechanism provided to a rotation shaft of the drum. The inhibition unit includes a rotation suppression device configured to suppress rotation of the drum by operating under control of the control unit and engaging the ratchet mechanism.

A vehicle according to the present invention is a vehicle capable of being charged using electric power from an external power source, including a power receiving wire for transmitting the electric power from the external power source to the vehicle, a wire housing device configured to be capable of housing the power receiving wire, and an inhibition unit configured to suppress pulling-out of the power receiving wire from the wire housing device based on a temperature of the power receiving wire.

Preferably, the vehicle further includes a temperature detection unit for detecting the temperature of the power receiving wire, and a control unit for controlling the inhibition unit to suppress pulling-out of the power receiving wire from the wire housing device based on the temperature of the power receiving wire.

Preferably, the control unit controls the inhibition unit to suppress pulling-out of the power receiving wire if the temperature of the power receiving wire is higher than a first threshold value.

Preferably, the control unit releases suppression of pulling-out of the power receiving wire if the temperature of the power receiving wire becomes higher than the first threshold value and thereafter becomes lower than a second threshold value which is lower than the first threshold value.

A power feeding device according to the present invention is a power feeding device for transmitting electric power from an external power source, including a power feeding wire for transmitting the electric power from the external power source, a wire housing device configured to be capable of housing the power feeding wire, and an inhibition unit configured to suppress pulling-out of the power feeding wire from the wire housing device based on a temperature of the power feeding wire.

Preferably, the power feeding device further includes a temperature detection unit for detecting the temperature of the power feeding wire, and a control unit for controlling the inhibition unit to suppress pulling-out of the power feeding wire from the wire housing device based on the temperature of the power feeding wire.

Preferably, the control unit controls the inhibition unit to suppress pulling-out of the power feeding wire if the temperature of the power feeding wire is higher than a first threshold value.

Preferably, the control unit releases suppression of pulling-out of the power feeding wire if the temperature of the power feeding wire becomes higher than the first threshold value and thereafter becomes lower than a second threshold value which is lower than the first threshold value.

Advantageous Effects of Invention

According to the present invention, in a cord reel capable of housing a power cord for transmitting electric power from an external power source to a vehicle that can be externally charged, pulling-out of the cord from the cord reel can be suppressed based on a temperature of the power cord wound around the cord reel. Thereby, influence on the surroundings exerted by the hot charging cord can be prevented.

DESCRIPTION OF EMBODIMENTS

Figure 1:
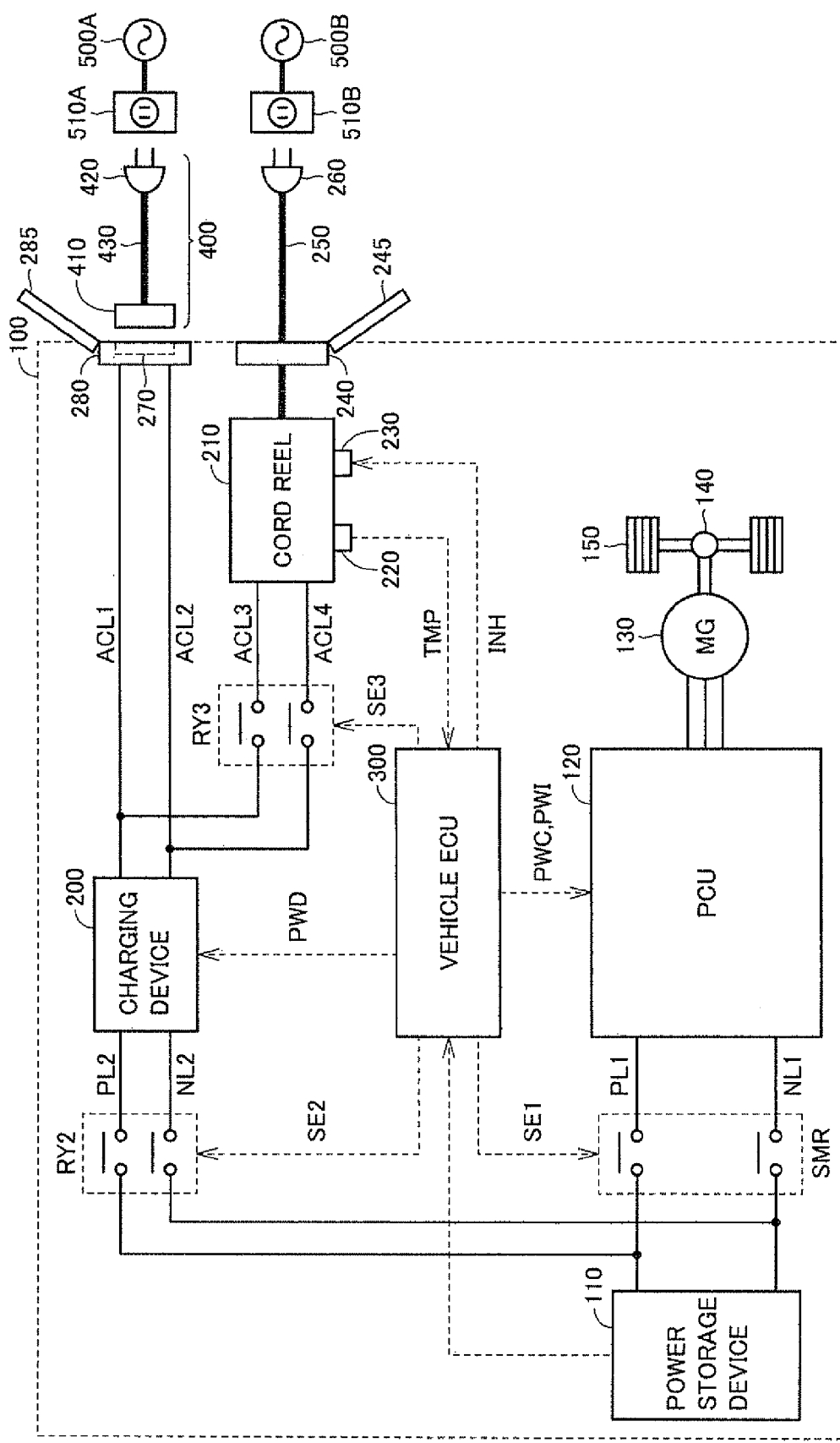
FIG. 1 is an overall block diagram of a vehicle in accordance with Embodiment 1.

Hereinafter, embodiments of the present invention will be described in detail with reference to the drawings, in which identical or corresponding parts will be designated by the same reference numerals, and the description thereof will not be repeated.

Embodiment 1

FIG. 1 is an overall block diagram of a vehicle 100 in accordance with the present embodiment.

Referring to FIG. 1, vehicle 100 includes a power storage device 110, a system main relay (SMR), a PCU (Power Control Unit) 120 as a drive device, a motor generator 130, a motive power transmission gear 140, drive wheels 150, and a vehicle ECU (Electronic Control Unit) 300.

Power storage device 110 is a power storing element configured to be chargeable and dischargeable. Power storage device 110 is configured to include, for example, a secondary battery such as a lithium ion battery, a nickel hydride battery, or a lead-acid battery, or a power storage element such as an electric double layer capacitor.

Power storage device 110 is connected to PCU 120 through a power line PL1 and a ground line NL1. Power storage device 110 supplies electric power for generating driving power for vehicle 100 to PCU 120. Further, power storage device 110 stores electric power generated by motor generator 130. Power storage device 110 has an output of, for example, about 200 V.

Relays included in the SMR are respectively inserted into power line PL1 and ground line NL1 connecting power storage device 110 and PCU 120. The SMR switches between supply and interrupt of electric power between power storage device 110 and PCU 120 based on a control signal SE1 from vehicle ECU 300.

PCU 120 is configured to include a converter for boosting a power supply voltage from power storage device 110, an inverter for converting direct current (DC) power with a voltage boosted by the converter into alternating current (AC) power for driving motor generator 130, and the like, which are not shown.

These converter and inverter are respectively controlled by control signals PWC, PW1 from vehicle ECU 300.

Motor generator 130 is an AC rotating electrical machine, and is, for example, a permanent magnet synchronous electric motor provided with a rotor having a permanent magnet embedded therein.

Output torque of motor generator 130 is transmitted to drive wheels 150 via motive power transmission gear 140 composed of a reduction gear and a motive power split mechanism, whereby vehicle 100 runs. During regenerative braking operation of vehicle 100, motor generator 130 can generate electric power with rotational force of drive wheels 150. The generated electric power is converted by PCU 120 into charging power for power storage device 110.

Although FIG. 1 shows a configuration in which one motor generator is provided, the number of motor generators is not limited thereto, and a plurality of motor generators may be provided.

Further, in a hybrid car equipped with an engine (not shown) in addition to motor generator 130, necessary vehicle driving power is generated through coordinated operation of the engine and motor generator 130. In this case, it is also possible to charge power storage device 110 using electric power generated by rotation of the engine.

Specifically, vehicle 100 in the present embodiment represents a vehicle equipped with an electric motor for generating vehicle driving power, and includes a hybrid car in which vehicle driving power is generated by an engine and an electric motor, an electric car and a fuel cell car not equipped with an engine, and the like.

Vehicle ECU 300 includes a CPU (Central Processing Unit), a storage device, and an input/output buffer which are not shown in FIG. 1, to receive a signal from each sensor or the like and output a control signal to each equipment, and to control vehicle 100 and each equipment. These controls can be performed not only by processing by software but also by processing by exclusive hardware (electronic circuit).

Vehicle ECU 300 generates and outputs control signals for controlling PCU 120, the SMR, and the like.

Although FIG. 1 shows a configuration in which vehicle ECU 300 is provided as one control device, individual control device may be provided for each function or each equipment to be controlled, such as a control device for PCU 120 and a control device for power storage device 110.

Vehicle 100 includes an inlet 270, a charging device 200, and a relay RY2, as a configuration for charging power storage device 110 using electric power from an external power source 500A.

Inlet 270 is provided at a power receiving port 280 provided in an outer surface of vehicle 100. An openable and closable lid portion (hereinafter also referred to as a "lid") 285 for covering inlet 270 when external charging is not performed is coupled to power receiving port 280.

A charging connector 410 of a charging cable 400 is connected to inlet 270. Then, the electric power from external power source 500A is transmitted to vehicle 100 through charging cable 400.

In addition to charging connector 410, charging cable 400 includes a plug 420 for connecting to an outlet 510A of external power source 500A, and a wire portion 430 for connecting charging connector 410 and plug 420. Wire portion 430 may include a charging circuit interrupt device (not shown) for switching between supply and interrupt of the electric power from external power source 500A.

Inlet 270 is connected to charging device 200 through power lines ACL1, ACL2.

Further, vehicle 100 also includes a power receiving cord 250, and a cord reel 210 as a wire housing device, as another path for charging power storage device 110 using electric power from an external power source 500B.

A plug 260 for connecting to an outlet 510B of external power source 500B is connected at one end of power receiving cord 250. The other end of power receiving cord 250 is connected to power lines ACL3, ACL4 connected to charging device 200.

Power lines ACL3, ACL4 are connected to power lines ACL1, ACL2 via a relay RY3. Relay RY3 is controlled by a control signal SE3 from vehicle ECU 300. Relay RY3 is electrically connected when external charging using power receiving cord 250 is performed, and is not connected when external charging using power receiving cord 250 is not performed.

When external charging is not performed, power receiving cord 250 is taken up and housed on cord reel 210. When external charging is performed using power receiving cord 250, power receiving cord 250 is pulled out from a pull-out opening (not shown) of a power receiving port 240 provided in the outer surface of vehicle 100. Then, plug 260 is connected to outlet 510A, and thereby the electric power from external power source 500A is transmitted to vehicle 100.

FIG. 1 shows a configuration in which, when charging cable 400 is used, it is connected to outlet 510A of external power source 500A, and when power receiving cord 250 is used, it is connected to outlet 510B of external power source 500B. However, external power sources 500A and 500B may have the same power supply voltage, or may have different power supply voltages. In the case where they have different power supply voltages, it may be set such that, for example, charging cable 400 is used when the external power source has a voltage of 200 V, and power receiving cord 250 is used when the external power source has a voltage of 100 V.

Further, an openable and closable lid 245 for covering the pull-out opening when external charging is not performed is coupled to power receiving port 240.

Cord reel 210 is, for example, a reel in the shape of a drum configured such that power receiving cord 250 is wound therearound.

Cord reel 210 is provided with a temperature detection unit 220. Temperature detection unit 220 is, for example, a temperature sensor or the like, and detects a temperature of taken-up power receiving cord 250 and outputs a detection value TMP thereof to vehicle ECU 300.

Further, cord reel 210 is provided with a pulling-out inhibition unit 230 for inhibiting pulling-out of power receiving cord 250. Pulling-out inhibition unit 230 inhibits power receiving cord 250 from being pulled out by stopping rotation of cord reel 210 in accordance with a control signal INH from vehicle ECU 300.

Charging device 200 is connected to inlet 270 through power lines ACL1, ACL2. Charging device 200 is also connected to power storage device 110 through a power line PL2 and a ground line NL2 via relay RY2.

Charging device 200 converts AC power supplied from inlet 270 or power receiving cord 250 into charging power for power storage device 110.

When charging is performed using power receiving cord 250 in vehicle 100 in FIG. 1, charging may be performed with a portion of power receiving cord 250 remaining on cord reel 210 without being pulled out. When charging is performed, a current flows through power receiving cord 250, and thereby Joule heat is generated by a resistance component of power receiving cord 250. Therefore, if a portion of power receiving cord 250 remains on cord reel 210, there is a possibility that, at a portion where power receiving cord 250 is wound around cord reel 210 in an overlapped state, the temperature of power receiving cord 250 itself may be increased beyond expectation by the heat released from power receiving cord 250. Further, in the case where the drum for winding power receiving cord 250 (described later) is conductive, a current flows through wound power receiving cord 250, and thereby the drum may generate heat by electromagnetic induction, and there is a possibility that the temperature of power receiving cord 250 may be increased by the heat of the drum.

In addition, if power receiving cord 250 with such an increased temperature is pulled out, the surroundings can be influenced by touching power receiving cord 250.

Accordingly, in the present embodiment, when the temperature of the cord wound around the cord reel is increased, rotation suppression control for the cord reel which suppresses pulling-out of the cord in accordance with the temperature of the cord is performed. Thereby, influence on the surroundings exerted by pulling out the hot cord can be reduced.

Figure 2:
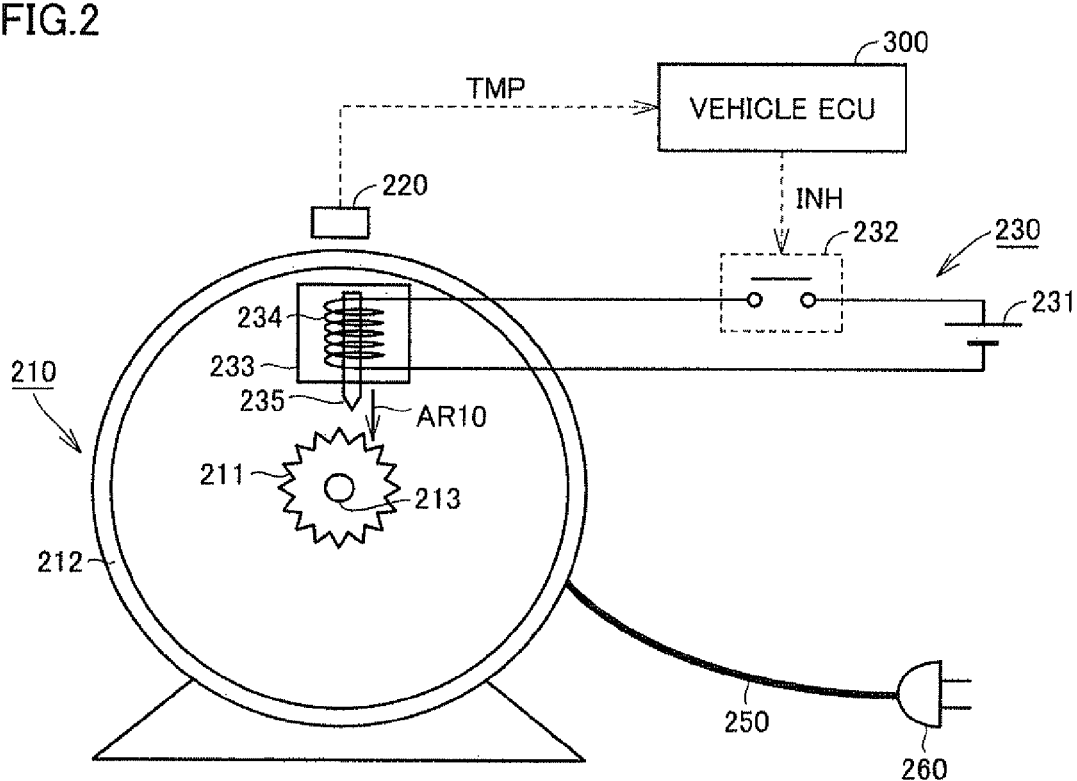
FIG. 2 is a view of a state where pulling-out of a power receiving cord is not limited in one example of a cord reel in accordance with Embodiment 1.
Figure 3:
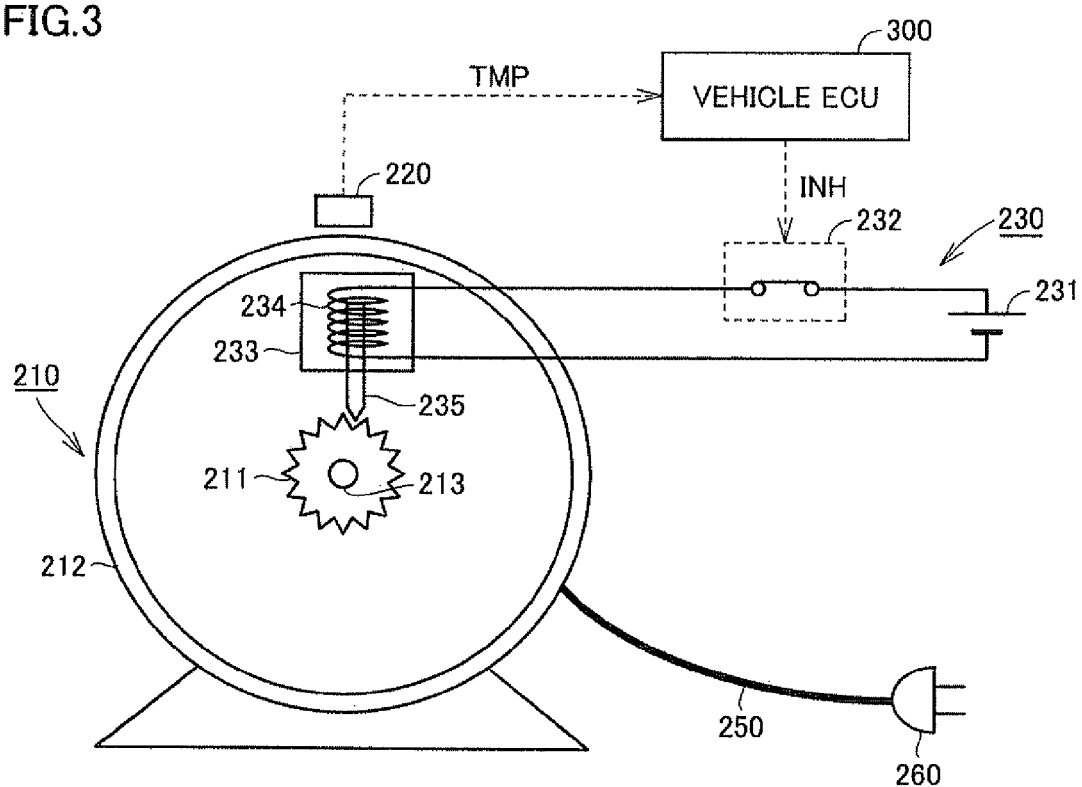
FIG. 3 is a view of a state where pulling-out of the power receiving cord is limited in one example of the cord reel in accordance with Embodiment 1.

FIGS. 2 and 3 are views for illustrating a manner in which pulling-out of power receiving cord 250 is suppressed by pulling-out inhibition unit 230 in vehicle 100 equipped with cord reel 210 in accordance with the present embodiment. FIG. 2 shows a state where pulling-out is not inhibited by pulling-out inhibition unit 230, whereas FIG. 3 shows a state where pulling-out is inhibited by pulling-out inhibition unit 230.

Referring to FIG. 2, cord reel 210 includes a rotation shaft 213, a drum 212 attached to rotation shaft 213 for winding power receiving cord 250 therearound, and a ratchet mechanism 211 attached to rotation shaft 213. When power receiving cord 250 is pulled out from cord reel 210 or housed thereon, drum 212 rotates about rotation shaft 213. Since ratchet mechanism 211 is attached to rotation shaft 213, it also rotates in accordance with rotation of drum 212.

FIG. 2 also shows one example of pulling-out inhibition unit 230. Pulling-out inhibition unit 230 includes a power source 231, a relay 232, and a rotation suppression device 233. Rotation suppression device 233 includes a solenoid 234 and a stopper 235.

Power source 231 may be, for example, an auxiliary battery (not shown) mounted in vehicle 100. Positive and negative terminals of power source 231 are respectively connected to both ends of solenoid 234.

Relay 232 is inserted into a path connecting power source 231 and solenoid 234. Relay 232 is controlled by control signal INH from vehicle ECU 300. Control signal INH is set to ON if detection value TPM from temperature detection unit 220 indicates that the temperature of power receiving cord 250 is increased, and accordingly a contact of relay 232 is closed. Further, control signal INH is set to OFF if the temperature of power receiving cord 250 is decreased, and accordingly the contact of relay 232 is opened. When the contact of relay 232 is closed, solenoid 234 is excited, and stopper 235 provided to penetrate solenoid 234 moves in a direction indicated by an arrow AR10 in FIG. 2. Thereby, stopper 235 engages ratchet mechanism 211 as shown in FIG. 3.

Figure 4:
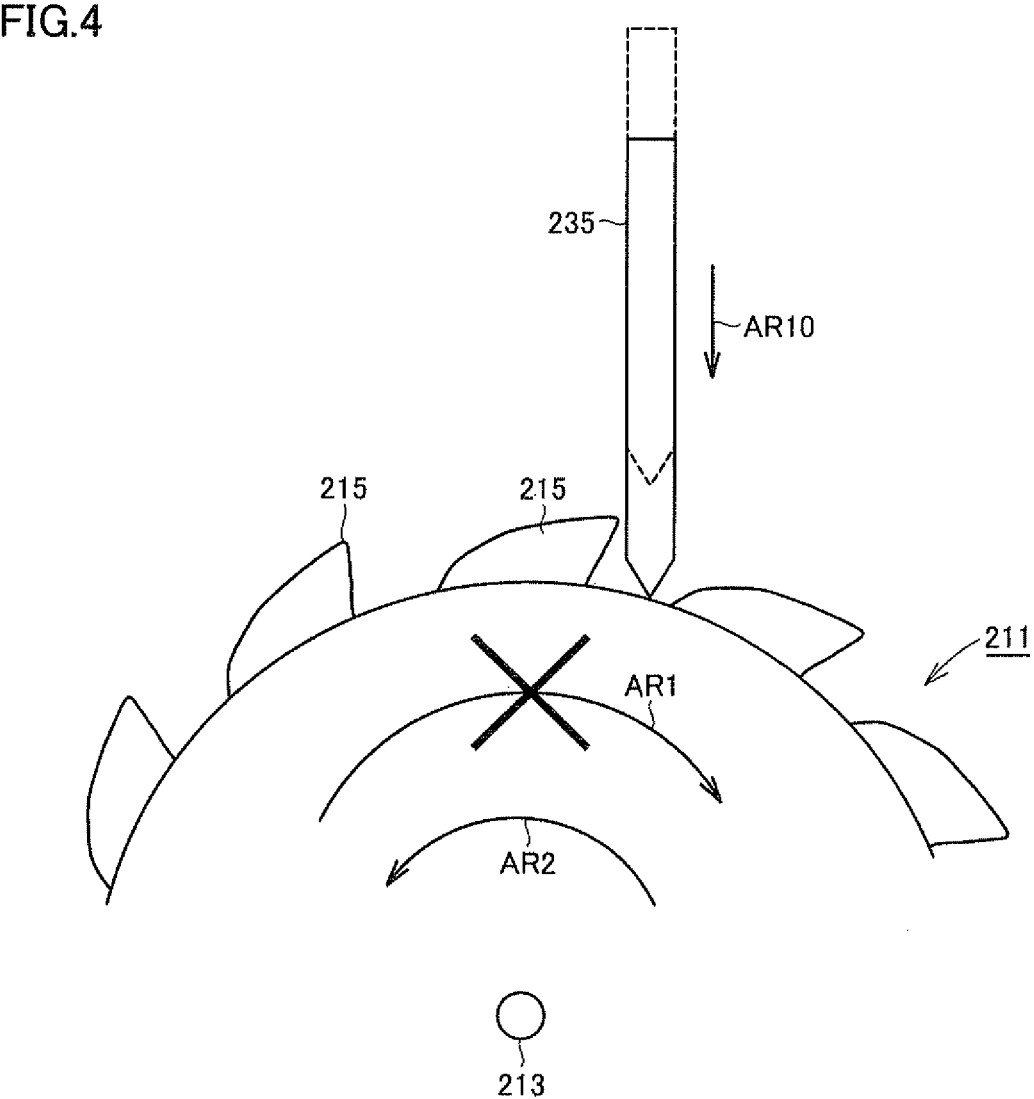
FIG. 4 is a view for illustrating a ratchet mechanism in FIGS. 2 and 3.

FIG. 4 is a view showing details of ratchet mechanism 211 in FIGS. 2 and 3. Ratchet mechanism 211 has such a structure that gear teeth are inclined in a rotational direction (teeth 215 in FIG. 4).

When stopper 235 is in a state indicated by a broken line in FIG. 4, ratchet mechanism 211 can rotate about rotation shaft 213 both in a clockwise direction (CW direction indicated by an arrow AR1) and in a counterclockwise direction (CCW direction indicated by an arrow AR2) in FIG. 4.

When the contact of relay 232 in FIG. 2 is closed by control signal INH and stopper 235 enters a state indicated by a solid line in FIG. 4 and engages ratchet mechanism 211, ratchet mechanism 211 can rotate in the CCW direction indicated by arrow AR2, but cannot rotate in the CW direction indicated by arrow AR1 as stopper 235 interferes with tooth 215. By setting a winding direction of power receiving cord 250 such that power receiving cord 250 is pulled out when drum 212 rotates, in the CW direction indicated by arrow AR1 and power receiving cord 250 is housed when drum 212 rotates in the CCW direction indicated by arrow AR2, pulling-out inhibition unit 230 can inhibit only pulling-out of power receiving cord 250, without inhibiting housing of power receiving cord 250.

The configuration for suppressing rotation of cord reel 210 is not limited to ratchet mechanism 211 shown in FIGS. 2 and 3, and various configurations can be employed. For example, rotation of cord reel 210 may be suppressed by installing an electromagnetic clutch or a braking device (both of which are not shown) in rotation shaft 213 and engaging the electromagnetic clutch or closing the brake when control signal INH is ON. Further, rotation of drum 212 may be inhibited by employing a configuration in which a plurality of holes are opened in a circumferential direction in a side surface of drum 212, and a stopper is provided to fit into at least one of the holes when control signal INH is ON. Furthermore, it is also possible to employ a configuration in which, instead of using an electric circuit as described above, for example, a shape-memory alloy, a bimetal, or the like is used for stopper 235, so that stopper 235 itself is deformed in accordance with an increase in the temperature of power receiving cord 250 and engages ratchet mechanism 211.

Figure 5:
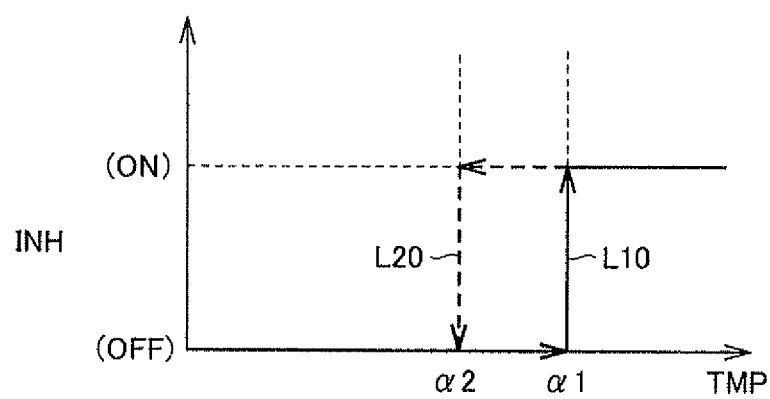
FIG. 5 is a view showing relationship between an inhibition signal for limiting pulling-out of the power receiving cord and a temperature of the power receiving cord.

FIG. 5 is a view showing relationship between an inhibition signal for limiting pulling-out of power receiving cord 250 and the temperature of power receiving cord 250 in the present embodiment. In FIG. 5, the axis of abscissas represents temperature TMP of power receiving cord 250 detected by temperature detection unit 220, and the axis of ordinates represents the state of control signal INH, that is, whether or not rotation of cord reel 210 is suppressed.

Referring to FIG. 5, if temperature TMP of power receiving cord 250 becomes higher than a prescribed first threshold value $\alpha 1$ (for example, 60° C.), control signal INH is set to ON as indicated by a solid line path L10 in FIG. 5. Accordingly, pulling-out inhibition unit 230 is driven, and thereby pulling-out of power receiving cord 250 from cord reel 210 is inhibited as described above.

If temperature TMP of power receiving cord 250 is decreased thereafter, control signal INH is not turned OFF at the first threshold value $\alpha 1$ described above, and when temperature TMP of power receiving cord 250 becomes lower than a second threshold value $\alpha 2$ (for example, 55° C.) which is lower than the first threshold value $\alpha 1$, control signal INH is set to OFF (indicated by a broken line path L20 in FIG. 5). Provision of hysteresis to settings of control signal INH to ON and OFF as described above can prevent a state where rotation inhibition and rotation permission for power receiving cord 250 are frequently repeated near a threshold value.

Figure 6:
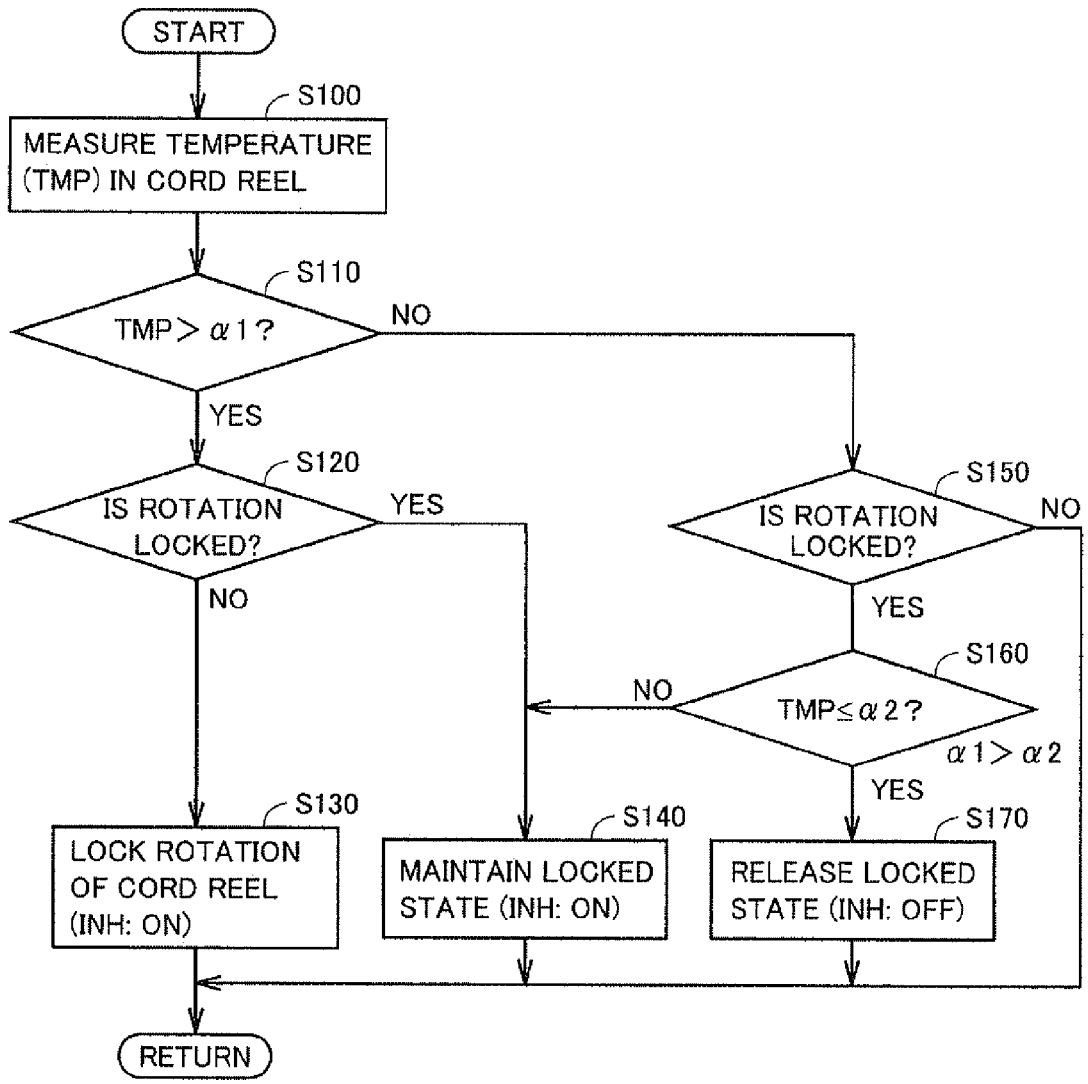
FIG. 6 is a flowchart for illustrating details of rotation suppression control processing for the cord reel performed in a vehicle ECU in Embodiment 1.

FIG. 6 is a flowchart for illustrating details of rotation suppression control processing for the cord reel performed in vehicle ECU 300 in Embodiment 1. Steps in the flowchart shown in FIG. 6 are implemented by invoking a program stored beforehand in vehicle ECU 300 from a main routine and executing the program with a prescribed cycle. Alternatively, for some of the steps, the processing can also be implemented by constructing exclusive hardware (electronic circuit).

Referring to FIGS. 1 and 6, in step (hereinafter abbreviated as S) 100, vehicle ECU 300 receives temperature TMP of power receiving cord 250 left on cord reel 210 detected by temperature detection unit 220.

Next, in S110, vehicle ECU 300 determines whether or not measured temperature TMP of power receiving cord 250 is higher than threshold value $\alpha 1$.

If temperature TMP of power receiving cord 250 is higher than threshold value $\alpha 1$ (YES in S110), the processing proceeds to S120, and vehicle ECU 300 determines whether or not control signal INH is already set to ON and rotation of cord reel 210 is suppressed by pulling-out inhibition unit 230.

If rotation of cord reel 210 is not suppressed (NO in S120), in S130, vehicle ECU 300 suppresses rotation of cord reel 210 by changing control signal INH from an OFF state to an ON state and operating pulling-out inhibition unit 230.

If rotation of cord reel 210 is already suppressed (YES in S120), vehicle ECU 300 maintains control signal INH in an ON state (S140).

On the other hand, if temperature TMP of power receiving cord 250 is not more than threshold value $\alpha 1$ (NO in S110), vehicle ECU 300 advances the processing to S150 to determine whether or not control signal INH is now set to ON and rotation of cord reel 210 is suppressed by pulling-out inhibition unit 230.

If rotation of cord reel 210 is suppressed (YES in S150), the processing proceeds to S160, and vehicle ECU 300 determines whether or not temperature IMP of power receiving cord 250 is not more than threshold value α2.

If temperature IMP of power receiving cord 250 is not more than threshold value α2 (YES in S160), in S170, vehicle ECU 300 releases suppression of rotation of cord reel 210 by changing control signal INH from an ON state to an OFF state.

If temperature TMP of power receiving cord 250 is higher than threshold value α2 (NO in S160), the processing proceeds to S140, and vehicle ECU 300 continuously maintains control signal INH in an ON state such that rotation of cord reel 210 is continuously suppressed.

On the other hand, if suppression of rotation of cord reel 210 is released (NO in S150), the processing returns to the main routine such that the state where suppression of rotation of cord reel 210 is released is continued.

By performing control according to the processing as described above, inhibition and permission of pulling-out of power receiving cord 250 from cord reel 210 are switched based on the temperature of power receiving cord 250. This can prevent hot power receiving cord 250 from being pulled out and influencing surrounding equipment and the like.

Embodiment 2

Although the configuration in which a cord reel is mounted in a vehicle has been described in Embodiment 1, a description will be given in Embodiment 2 on a configuration in which a power feeding device is provided with a cord reel, and a power feeding cord is pulled out from the power feeding device and connected to a vehicle.

Figure 7:
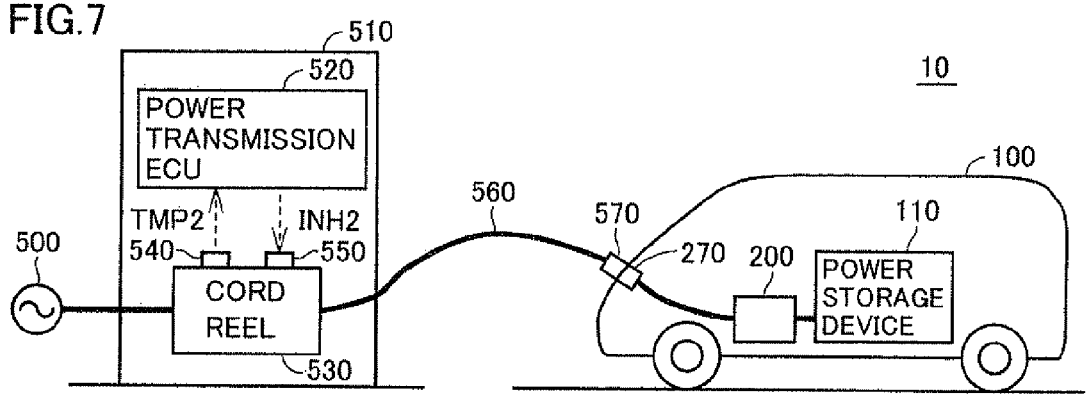
FIG. 7 is an overall block diagram of a charging system including a power feeding device in accordance with Embodiment 2.

FIG. 7 is an overall block diagram of a charging system 10 including a power feeding device 510 in accordance with Embodiment 2.

Referring to FIG. 7, charging system 10 includes vehicle 100 that can be externally charged as shown in FIG. 1, and power feeding device 510 for feeding electric power from an external power source 500 to vehicle 100.

Power feeding device 510 includes a cord reel 530, a temperature detection unit 540, a pulling-out inhibition unit 550, and a power transmission ECU 520.

A power feeding cord 560 is wound around cord reel 530. When external charging is performed, power feeding cord 560 is pulled out from the cord reel, and connected to inlet 270 of vehicle 100 using a charging connector 570 (corresponding to charging connector 410 in FIG. 1) provided at one end of power feeding cord 560. The electric power from external power source 500 connected to the other end of power feeding cord 560 is transmitted to vehicle 100 through power feeding cord 560.

Further, when external charging is not performed, cord reel 530 can take up and house power feeding cord 560.

Temperature detection unit 540 corresponds to temperature detection unit 220 in FIG. 1. Temperature detection unit 540 detects a temperature of power feeding cord 560, and outputs a detection value TMP2 thereof to power transmission ECU 520.

Pulling-out inhibition unit 550 corresponds to pulling-out inhibition unit 230 in FIG. 1. Pulling-out inhibition unit 550 switches between inhibition and permission of pulling-out of power feeding cord 560 from cord reel 530 in accordance with a control signal INH2 from power transmission ECU 520. Since the detailed configuration of pulling-out inhibition unit 550 is identical to that in Embodiment 1, the description thereof will not be repeated.

As with vehicle ECU 300 in FIG. 1, power transmission ECU 520 receives temperature TMP2 of power feeding cord 560 from temperature detection unit 540, and generates control signal INH2 for switching between inhibition and permission of pulling-out of power feeding cord 560 in accordance with temperature TMP2 of power feeding cord 560 and outputs control signal INH2 to pulling-out inhibition unit 550.

Rotation suppression control for the cord reel in power transmission ECU 520 can be performed as with the rotation suppression control for the cord reel in vehicle ECU 300 in Embodiment 1. Specifically, rotation suppression control for the cord reel can be implemented by performing processing identical to that in the flowchart shown in FIG. 6 in power transmission ECU 520.

Figure 8:
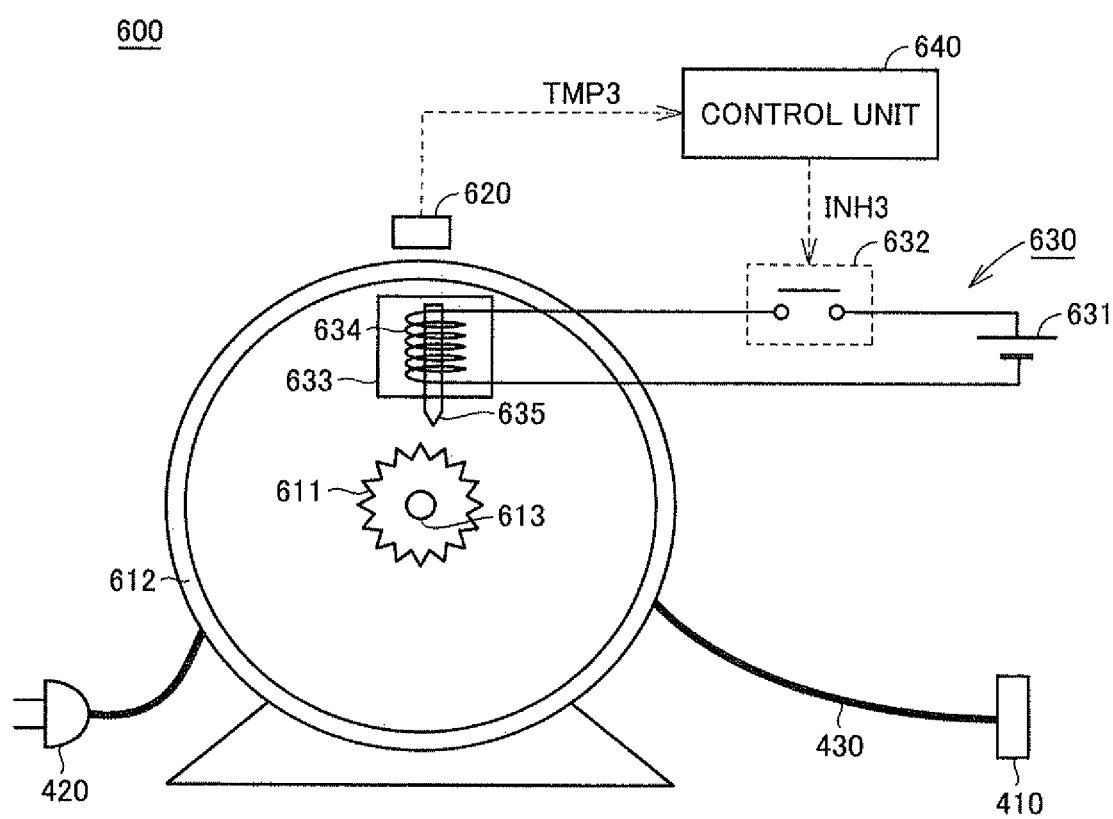
FIG. 8 is a view showing one example of a standalone cord reel in accordance with the present embodiment.

In Embodiments 1 and 2, the description has been given on the configuration in which the cord reel is mounted in vehicle 100 and power feeding device 510 to house power receiving cord 250 and power feeding cord 560, respectively. However, the cord reel is not limited to the one mounted in vehicle 100 and power feeding device 510, and can also be configured as a standalone cord reel independent from vehicle 100 and power feeding device 510 which houses, for example, charging cable 400 shown in FIG. 1 (FIG. 8). In this case, as shown in FIG. 8, a cord reel 600 is configured to independently include, in addition to a temperature detection unit 620 and a pulling-out inhibition unit 630, a control unit 640 for controlling pulling-out inhibition unit 630. The configuration shown in FIG. 8 is identical to the configuration in FIG. 2 described in Embodiment 1 except that, instead of power receiving cord 250, charging cable 400 is wound around a drum 612, and thus the detailed description of the elements will not be repeated.

It should be understood that the embodiments disclosed herein are illustrative and non-restrictive in every respect. The scope of the present invention is defined by the scope of the claims, rather than the description above, and is intended to include any modifications within the scope and meaning equivalent to the scope of the claims.

REFERENCE SIGNS LIST

10: charging system, 100: vehicle, 110: power storage device, 120: PCU, 130: motor generator, 140: motive power transmission gear, 150: drive wheel, 200: charging device, 210, 530, 600: cord reel, 211, 611: ratchet mechanism, 212, 612: drum, 213, 613: rotation shaft, 215: tooth, 220, 540, 620: temperature detection unit, 230, 550, 630: pulling-out inhibition unit, 231, 631: power source, 232, 632, RY2, RY3: relay, 233, 633: rotation suppression device, 234, 634: solenoid, 235, 635: stopper, 240, 280: power receiving port, 245, 285: lid, 250: power receiving cord, 260, 420: plug, 270: inlet, 300: vehicle ECU, 400: charging cable, 410, 570: charging connector, 430: wire portion, 500, 500A, 500B: external power source, 510A, 510B: outlet, 510: power feeding device, 520: power transmission ECU, 560: power feeding cord, 640: control unit, ACL1 to ACL4, PL1, PL2: power line, NL1, NL2: ground line.

The invention claimed is:

1. A wire housing device configured to be capable of housing a wire for transmitting electric power from a power source, the wire housing device comprising:
an inhibition unit configured to suppress pulling-out of the wire from the wire housing device in accordance with a temperature of the wire.

2. The wire housing device according to claim 1, further comprising:
   a temperature detection unit configured to detect the temperature; and
   a control unit configured to control the inhibition unit to suppress pulling-out of the wire from the wire housing device based on the temperature.

3. The wire housing device according to claim 2, wherein the control unit controls the inhibition unit to suppress pulling-out of the wire if the temperature is higher than a first threshold value.

4. The wire housing device according to claim 3, wherein the control unit releases suppression of pulling-out of the wire if the temperature becomes higher than the first threshold value and thereafter becomes lower than a second threshold value which is lower than the first threshold value.

5. The wire housing device according to claim 2, further comprising:
   a drum configured wind and house the wire; and
   a ratchet mechanism provided to a rotation shaft of the drum,
   wherein the inhibition unit includes a rotation suppression device configured to suppress rotation of the drum by operating under control of the control unit and engaging the ratchet mechanism.

6. A vehicle capable of being charged using electric power from an external power source, comprising:
   a power receiving wire configured to transmit the electric power from the external power source to the vehicle;
   a wire housing device configured to house the power receiving wire; and
   an inhibition unit configured to suppress pulling-out of the power receiving wire from the wire housing device based on a temperature of the power receiving wire.

7. The vehicle according to claim 6, further comprising:
   a temperature detection unit configured to detect the temperature; and
   a control unit configured to control the inhibition unit to suppress pulling-out of the power receiving wire from the wire housing device based on the temperature.

8. The vehicle according to claim 7, wherein the control unit controls the inhibition unit to suppress pulling-out of the power receiving wire if the temperature is higher than a first threshold value.

9. The vehicle according to claim 8, wherein the control unit releases suppression of pulling-out of the power receiving wire if the temperature becomes higher than the first threshold value and thereafter becomes lower than a second threshold value which is lower than the first threshold value.

10. A power feeding device for transmitting electric power from an external power source, comprising:
    a power feeding wire configured to transmit the electric power from the external power source;
    a wire housing device configured to house the power feeding wire; and
    an inhibition unit configured to suppress pulling-out of the power feeding wire from the wire housing device based on a temperature of the power feeding wire.

11. The power feeding device according to claim 10, further comprising:
    a temperature detection unit configured to detect the temperature; and
    a control unit configured to control the inhibition unit to suppress pulling-out of the power feeding wire from the wire housing device based on the temperature.

12. The power feeding device according to claim 11, wherein the control unit controls the inhibition unit to suppress pulling-out of the power feeding wire if the temperature is higher than a first threshold value.

13. The power feeding device according to claim 12, wherein the control unit releases suppression of pulling-out of the power feeding wire if the temperature becomes higher than the first threshold value and thereafter becomes lower than a second threshold value which is lower than the first threshold value.

* * * * *